June 5, 1923.
A. J. WHITE
1,457,803
APPARATUS FOR SEPARATING SOLIDS FROM LIQUIDS
Filed Sept. 2, 1920
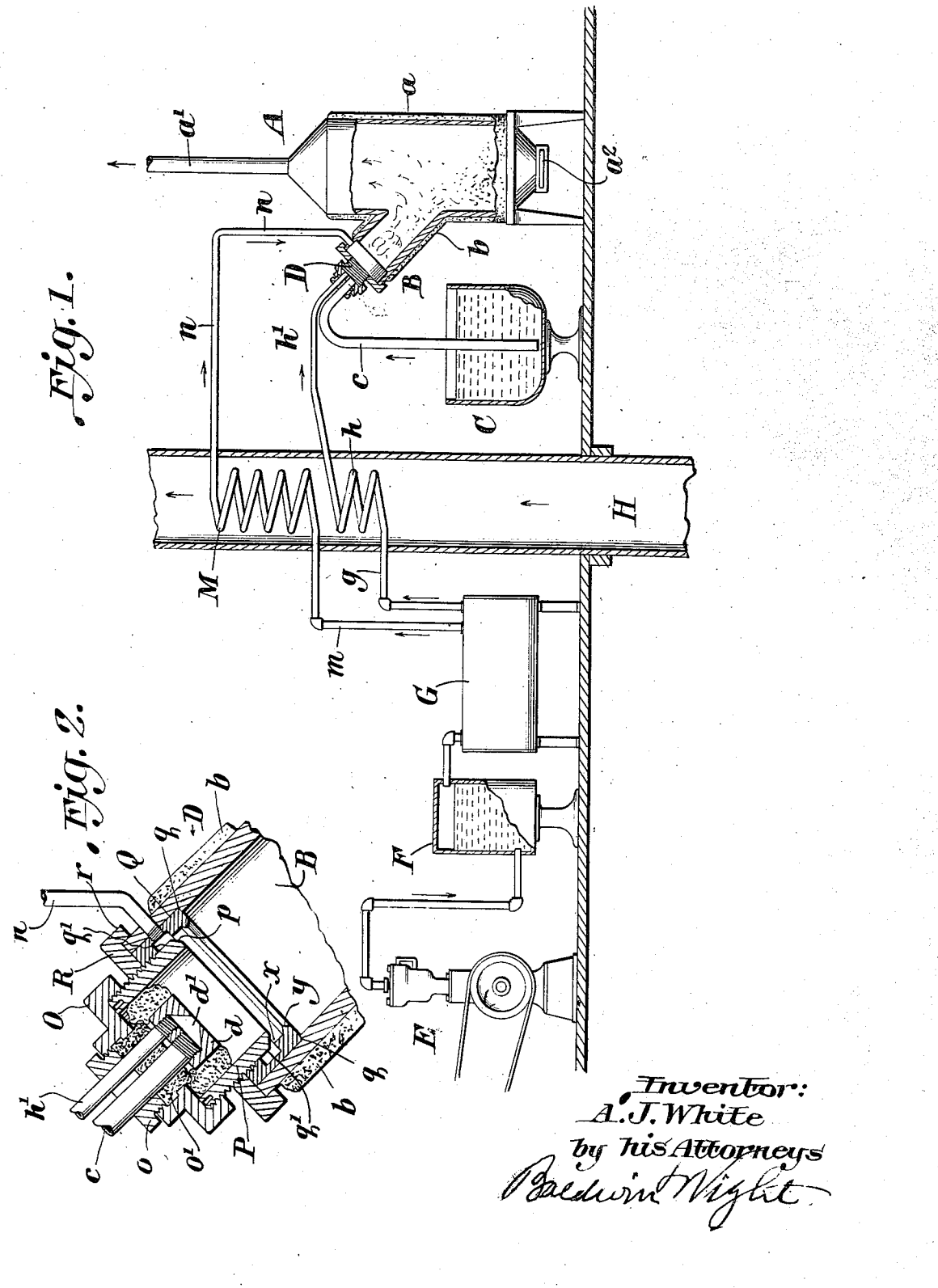
Inventor:
A. J. White
by his Attorneys

Patented June 5, 1923.

1,457,803

UNITED STATES PATENT OFFICE.

ALMON J. WHITE, OF SAN ANTONIO, TEXAS.

APPARATUS FOR SEPARATING SOLIDS FROM LIQUIDS.

Application filed September 2, 1920. Serial No. 407,671.

*To all whom it may concern:*

Be it known that I, ALMON J. WHITE, a citizen of the United States, residing in San Antonio, county of Bexar, and State of Texas, have invented certain new and useful Improvements in Apparatus for Separating Solids from Liquids, of which the following is a specification.

This invention relates to apparatus for separating solids from liquids, in which the liquid is treated in such manner as to evaporate the moisture and deposit the solids in powdered form. The apparatus made in accordance with my invention is especially designed for obtaining milk in powdered form, but it may be used for other purposes. For convenience I hereinafter describe my improvements as used for obtaining powdered milk, but wish it understood that the invention is not limited to such use.

According to my invention milk in liquid form, either in a natural condition as it comes from the cow with all of its constituent parts, or milk with all or part of one or more of its constituent parts removed, such as butter fat or water, can be introduced in an atomized condition into a desiccating chamber and at the same time it is heated in such manner that the moisture is vaporized and caused to rise and pass out of the chamber while the milk particles, in a powdered condition, are deposited and are collected in the bottom of the chamber.

In order to introduce the milk into the desiccating chamber in an atomized state, I cause atmospheric air under pressure to pass through a purifier into a cooler, which has the effect of drying the air to some extent and depriving it of moisture absorbed while passing through the purifier and from the drier the air is led to a heater, where it is raised to a moderate temperature, say 200° F. The air thus heated is conveyed to a preliminary atomizer which is also connected with the milk supply and such atomized milk is thus introduced into the desiccating chamber. In order to promote the operation and to raise the temperature of the atomized milk, I provide an annular air injector which is connected with a source of purified, dry and hot air, and which introduces such air into the chamber in such manner as to further heat and atomize the liquid while being introduced. The air thus introduced is heated to a higher temperature, say 400° F., in order that the atomized liquid may be thoroughly desiccated. In order to obtain the best results, the atomizer is arranged to project the atomized liquid in a downwardly inclined direction and experience has demonstrated that in this way the solids are effectively separated from the vapors.

In the accompanying drawings,

Figure 1 shows diagrammatically apparatus for carrying out my invention; and

Figure 2 is a view on an enlarged scale showing the atomizing and heating devices and the manner in which they are connected with the desiccating chamber.

The desiccating chamber is indicated at A. It consists of a metallic vessel covered with insulating material $a$, provided with a moisture exit pipe $a'$ at the top and a solids discharge gate $a^2$ at the bottom. It is provided on one side with a lateral arm B, which functions as a concentrating chamber and which is inclined downwards from its outer end toward the bottom of the chamber. The desiccating vessel and its arm or concentrating chamber are preferably insulated as indicated at $a$ and $b$. While I have shown the preferred kind of desiccating chamber, it should be understood that my invention is not limited to the particular desiccator shown, although an important part of my invention is the provision shown for introducing the atomized and heated milk in a downwardly inclined direction.

The milk may be drawn from any suitable source of supply, indicated diagrammatically at C, and it is drawn through the pipe $c$ to the atomizer and heater D, the details of which will be hereinafter described.

Atmospheric air is forced by compressor E through a purifier F, containing lime water or other purifier which absorbs oil, gases or other impurities passing from the compressor which would tend to impart an objectionable odor to the liquid.

From the purifier the air passes to a reservoir G, which serves as a compressed air tank for supplying the atomizer and heater. The tank may be water-jacketed or otherwise cooled in order to dry out the moisture absorbed by the air while passing through the liquid purifier, and also the moisture condensed in compressing the air. After the tank is filled with compressed, purified air, it may be separated or cut off from the compressor if desired, or the supply of compressed air may be continuous.

From the tank G air is conveyed by a pipe $g$ through a coil $h$, which is heated in any suitable way, as by furnace gases in the stack H, and from the coil $h$ the air passes through a pipe $h'$ to the atomizer and heater D. Preferably the air passing through the coil $h$ is heated to a temperature of about 200° F. Air also passes from the tank G through a pipe $m$ to a coil M, where it is heated to a higher temperature, say 400° F., and from the coil the air under pressure passes through a pipe $n$ to the atomizer and heater D. The atomizer and heater are of novel construction and serve to introduce the milk in a finely atomized and heated condition into the concentrating and desiccating chamber.

As shown in Figure 2, the inner ends of the pipes $h'$ and $c$ are connected with an atomizing device $d$. The atomized milk passes out through a restricted opening $d'$ into the arm B of the chamber A. The pipes $h'$ and $c$ are held in place by a cap O, carrying a follower $o$ through which the pipes pass and which holds in place suitable packing material $o'$, such as asbestos. Other means may be employed for preventing the milk from cooking or coagulating. The cap O has a threaded connection with a sleeve P, which surrounds the atomizing device $d'$ and which has a threaded connection with a ring Q, the inner end of which rests on a shoulder $q$, formed in the arm B. The ring Q is formed with an annular groove $q'$, surrounding the inner end of the sleeve P which latter is beveled at $p$ and at this point there is an annular outlet $x$ for heated, compressed air. The ring Q projects beyond the inner end of the sleeve P and is formed with an annular rib $y$. A cap R has a threaded connection with the sleeve P, as shown, and is formed with a flange $r$ which engages the outer end of the arm B.

The construction is such that the parts described may be easily assembled or quickly taken apart. In operation the compressor E is operated to fill the tank G with compressed, purified air. Air under pressure is drawn from the tank and heated in the manner before described. Milk is drawn from the source of supply to the preliminary atomizer by the heated air, entering through the pipe $h'$, and such milk is injected in a downward direction through the concentrating arm B into the desiccating chamber. At the same time air heated to a higher temperature is admitted to the heating devices surrounding the atomizer at the outer end of the concentrating arm of the desiccating chamber, and this heated air is discharged through the annular discharge passage $x$ into the concentrating arm B, serving to more completely atomize the liquid and to raise its temperature. While I have shown and described a preferred form of heating device, I do not wish to be understood as limiting my invention to the particular device shown. The liquid thus atomized and heated passes in a downward direction through the concentrating arm B and enters the desiccating chamber, where it is expanded, the vapors passing out through the exit pipe $a$, while the solids pass downwards and are collected at the bottom of the chamber.

An important feature of the invention is the provision for heating the atomized milk after it leaves the atomizer and before it enters the desiccating chamber.

It will be observed that air at a comparatively low temperature is employed for atomizing the milk and this atomized milk is subsequently treated by air at a much higher temperature. In this way the low temperature air serves to atomize the milk without evaporating the water therein, while the high temperature air evaporates the water as well as further atomizing the atomized milk.

Another important feature of the invention is the provision of means for injecting the atomized liquid in a downward direction into the desiccating chamber whereby the moisture is caused to pass upwards from this chamber while the solids pass downwards to the bottom thereof.

I claim as my invention:

1. Apparatus for separating solids from liquids comprising a desiccating chamber having an arm inclined downwards from its outer end toward the bottom of the chamber and constituting a concentrating chamber, an atomizer connected with and discharging into the outer end of said arm and with a source of compressed air and a liquid reservoir, and means associated with the desiccating chamber for conveying upwards the separated moisture and downwards the separated solids.

2. Apparatus for separating solids from liquids comprising a desiccating chamber, a concentrating chamber associated therewith and opening thereinto, said concentrating chamber having its longitudinal axis inclined downwardly toward the longitudinal axis of the desiccating chamber and connected thereto on the side about in the middle thereof, an atomizer in said concentrating chamber, and arranged to project an atomized spray of liquid through the same and into the desiccating chamber, and in a generally downward direction, said desiccating chamber arranged to discharge water vapor and solids separately.

3. Apparatus for separating solids from milk comprising a desiccating chamber, an atomizer discharging into said chamber and connected with a source of compressed air and a milk reser oir, means for heating the air to a temperature below the boiling point of the milk for atomizing the milk, means for providing an additional supply of compressed air to the mixture leaving the atomizer to further atomize the milk and evaporate the moisture, and means for heating the additional supply of air to a temperature above the boiling point of milk.

4. Apparatus for separating solids from milk comprising a desiccating chamber having an upwardly inclined lateral arm, an atomizer in the outer end of said arm connected to a source of compressed air and a milk reservoir, means for heating the air to a temperature below the boiling point of milk for atomizing the milk, means for providing an additional supply of compressed air to the mixture leaving the atomizer to further atomize the liquid and evaporate the moisture, means for heating the additional supply of air to a temperature above the boiling point of milk, and separate means for discharging the water vapor and solids from the desiccating chamber.

In testimony whereof, I have hereunto subscribed my name.

ALMON J. WHITE.